United States Patent [19]

Lankes, Jr.

[11] 4,001,027
[45] Jan. 4, 1977

[54] INK CONTAINING METHYLENEDISALICYLIC ACID AND METHOD FOR OFFSET PRINTING

[75] Inventor: Richard George Lankes, Jr., Fairfield, Ohio

[73] Assignee: Borden, Inc., Columbus, Ohio

[22] Filed: Jan. 24, 1975

[21] Appl. No.: 543,662

[52] U.S. Cl. .................................. 106/23; 106/27; 106/28; 106/29; 106/30; 106/31; 106/32; 252/301.34; 96/29 L; 96/31; 96/109

[51] Int. Cl.$^2$ ................ C09D 11/02; C09D 11/06; C09D 11/12

[58] Field of Search .............. 106/19, 20, 21, 2, 22, 106/23, 289, 27, 28, 29, 30, 31, 32; 252/301.2 R; 101/450–452, 465, 469, 473; 96/292, 31, 109

[56] References Cited

UNITED STATES PATENTS

| | | | |
|---|---|---|---|
| 3,615,750 | 10/1971 | Blair | 106/27 |
| 3,803,070 | 4/1974 | Spencer et al. | 106/25 X |
| 3,890,156 | 6/1975 | Matsukawa et al. | 106/19 |

FOREIGN PATENTS OR APPLICATIONS

| | | |
|---|---|---|
| 959,563 | 6/1964 | United Kingdom |
| 1,068,874 | 5/1967 | United Kingdom |

*Primary Examiner*—Joan Welcome
*Attorney, Agent, or Firm*—George P. Maskas; George A. Kap; Daniel D. Mast

[57] ABSTRACT

Methylenedisalicylic acid is added to ink containing a pigment derived from fluorescein to overcome tinting and scumming when the ink is used in offset printing.

14 Claims, No Drawings

INK CONTAINING METHYLENEDISALICYLIC ACID AND METHOD FOR OFFSET PRINTING

This invention relates to inks containing pigments derived from fluorescein which pigments are modified with methylenedisalicylic acid to make the inks suitable for use in web offset printing.

Xanthene pigments include some of the most beautiful and interesting synthetic dyestuff and pigments. The rhodamines are representative of the basic type of xanthene colors whereas fluoresecins, eosins, phloxines, erythrosins and rose bengals are representative of the acid type.

Condensation of resorcinol and phthalic anhydride, with zinc chloride as the condensing catalyst, yields fluoresecin having the following structure:

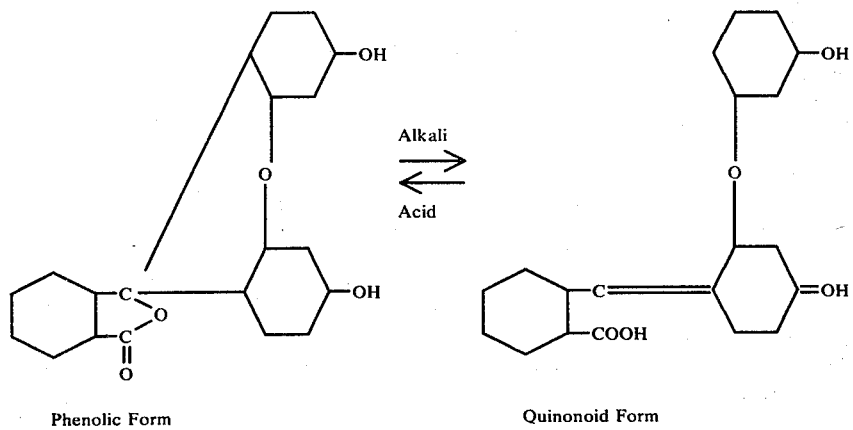

Phenolic Form          Quinonoid Form

Fluorescein can react bromine to yield Eosin dye after neutralizing with an alkaline solution. Eosin can be either a sodium or a potassium salt. Eosin has the following structure:

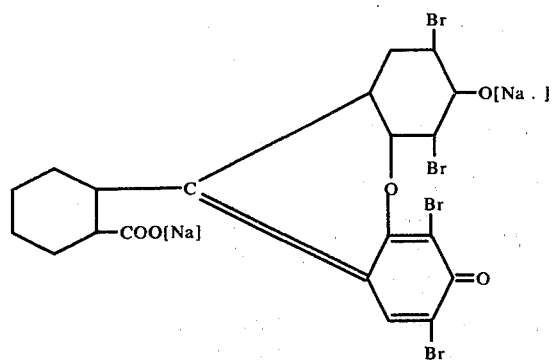

Bromination is conducted with either alcoholic or aqueous solution. In actual practice, sodium chlorate is added to oxidize the hydrobromic acid formed, regenerating free bromine, thus achieving a more economical operation.

In spite of its extreme lack of permanency to light and its poor resistance to alkalinity, Eosin is used in very large volume in preparation of lakes and toners or pigments, the latter being known as Phloxine toners or pigments. The use of the term "Phloxine" in connection with such pigments is confusing since they are not derived from the pholoxin dyestuff, which is a di- or tetrachlorotetrabromofluorescein. It is probable that this term has its real derivation in the older use of the name "phlox" toner in which the pigment was named for the phlox flower.

Phloxine red pigment is used in process printing where light fastness is not a prerequisite. Where this property is required, however, molybdated or tungstated rhodamines are used. Presently, lithol rubine is more expensive than the phloxine pigment and the molydated or tungstated rhodamines are a great deal more expensive than the phloxin pigment. Spectrophotometrically, however, phloxine pigment is superior to lithol rubine and only slightly inferior to the molybdated or tungstated rhodamines.

In commercial practice, the Eosin dye used in production of the Phloxine pigment is not a pure tetrabromo compound but is a mixture containing 70 to 80% tetrabromo, 15 to 19% of tribromo, 1 to 5% dibromo and traces of monobromo and fluorescein. The Phloxine pigment is prepared by dissolving in water Eosin, which is also referred to as a sodium or potassium salt of bromo acid. Bromo acid is the acid of Eosin where each of the two sodium atoms is replaced by a hydrogen atom. Precipitation is accomplished by addition of a soluble salt of lead of aluminum, such as lead nitrate, to a dilute solution of the sodium salt of the bromo acid to yield Phloxine red pigment, i.e., lead salt of the Eosin dye or the lead lake of tetrabromo fluorescein having the following structure:

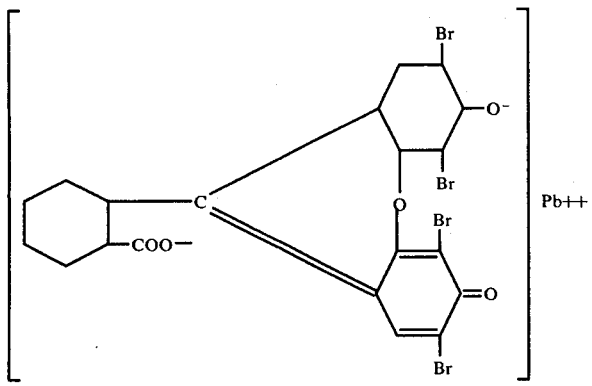

Phloxine red pigment, i.e., the lead salt of the Eosin dye, is insoluble in water and thus precipitates out in finely divided form. Characteristics of this pigment can be modified by co-precipitating the sodium salt of rosin, sulfonated castor oil or other organic acids. Precipitated pigment particles are filtered and washed with water to reduce content of the soluble salts. The press cake is collected in a filter press which normally contains 19 to 24% pigment, balance being essentially water. The press cake can be dried or flushed into a suitable vehicle.

Other examples of dyestuffs derived from fluorescein include erythrosin 3-B, tetraido fluorecein CI 773, Sch. No. 592, which is obtained by complete iodination of fluorescein; Phloxin, tetra bromo fluorescein CI 774, Sch. No. 593, which is obtained by bromination of dichlorofluorescein; Rose Bengal, tetra iodo tetra chlor fluorescein CI 777, Sch. No. 595, obtained by iodination of dichlorofluorescein; Phloxin B, tetra chlor tetra bromo fluorescein CI 778, Sch. No. 596; and Rose Bengal tetra iodo tetra chlor fuorescein, a slightly different shade of Rose Bengal, 3-B, CI 779, Sch. No. 597.

Lakes can be prepared by precipitation of a pigment on various bases such as alumina hydrate, blanc fixe, gloss white, and others, since no absorption of color by the base is necessary. The phloxine red pigment is sufficiently insoluble that a very slight excess of lead salt is required to precipitate same.

Phloxine red pigment has been known commercially for many years and has been used principally as the red pigment for letterpress process printing. This pigment has been used in relatively small quantities for offset and web offset printing because of the inherent tendency of inks to tint and scum in the fountain etch solutions.

There is a marked difference between letterpress and flexographic printing on one hand and offset or lithographic printing, on the other. In letterpress, printing is done from a raised type whereas in offset printing, the printing area accepts printing ink and the non-printing area is hydrophilic and is wet by water or fountain etch solution. More specifically, in letterpress printing, the raised type is coated with ink and the impression is imparted to a substrate. In offset printing, a printing plate is treated to form printing and non-printing areas which will accept either water solution or ink. When aqueous fountain solution is applied, it adheres to non-printing areas. This is followed by application of ink, which adheres to the printing areas. The ink impression is imparted to a substrate through an offset cylinder having a resilient surface.

Scumming or greasing occur when the non-printing area begins to show ink specs, streaks or general dirtiness in the background areas. Often, thickening of printed characters or filling of halftones takes place.

Among the causes of scumming are poorly made plates in which the non-printing area may not have properly desensitized. The dampening rollers may be dirty or greasy and may not be carrying the fountain solution properly to the plate. Also, the fountain solutions may be too weak in that they have a high pH.

Amount of fountain solution and inks carried to the plate by the respective rollers must be balanced. If the ink is too soft or if an excess amount of ink is carried, it may be picked up in the non-printing areas. The remedy in this instance is to carry an excess of fountain solution or increase its strength.

Scumming may also be caused by an excessive use of ink additives. Adding heavy bodied lithographic varnish usually corrects this condition.

Inks which are not sufficiently water repellent may take up too much fountain solution, particularly if excess fountain solution is being applied to the plate. Thus, they become water-logged or emulsified in the fountain solution and transfer to the non-printing area. This may occur when wetting agents or too much of the wrong type of drier is used. Occasionally, components in the paper may leach out in the fountain solution and cause scumming.

Tinting is a uniform discloration in the non-printed area of the substrate indicating trouble in the ink fountain solution. It may be due to actual bleeding of ink pigment into the fountain solution which is an indication that the offending pigment is too water soluble. This may also be due to an actual transfer of pigment from the oil phase to the water or fountain solution phase. The color, if the tinting condition is present, is transferred to the non-printing area by the fountain solution.

Fresh ink is more prone to tinting trouble than aged ink. As ink ages, the pigment particles become wetted more thoroughly and thereby are better protected by the vehicle.

As was already mentioned briefly, addition of methylenedisalicylic acid to finished inks containing a pigment, such as the phloxine red pigment, produces offset inks which print satisfactorily and show little or no tendency to tint or scum. Although the tinting and scumming problem alluded to herein can be overcome by admixing lithol rubine with phloxine red pigment, this solution is not very appealing because of the higher cost of lithol rubine. The specific acid used is the 5,5'-methylenedisalicyclic acid (MDA) which is effective in amounts varying from 5 to 20% by weight of real phloxine red pigment, and preferably from 8 to 12%. The 5,5'-methylenedisalicylic acid has the following structural formula:

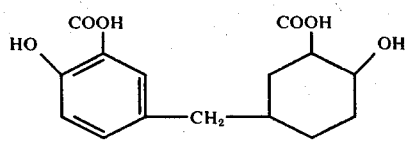

Because of its close analogy to methylenedisalicylic acid, salicylic acid was tried but, surprisingly, was found to be ineffective in overcoming the tinting and scumming problems in offset inks based on phloxine red pigment.

The use of MDA can be effected in many ways. Finished ink can be compounded with MDA directly by adding MDA to a varnish; by adding an MDA dispersion in varnish to the flush color; by adding MDA to the phloxine red pigment before it goes to a filter which can be accomplished by adding MDA to the phloxine color slurry, or by adding the sodium salt of MDA to Eosin.

The ink vehicle is the liquid portion of an ink that holds and carries the pigment and provides workability and drying properties, and also binds the pigment to the substrate after the ink has dried. A varnish can be used either as a vehicle or as a cover for surfaces. It is a broad term which includes fluid compositions comprising one or more of the following: oils, resins, solvents, driers and waxes. Amount of vehicle in an ink composition described herein may vary from 25 to 60%, preferably from 40 to 60%.

Finished inks described herein contain the following ingredients in amounts indicated:

| | |
|---|---|
| flush color, 10 to 15% pigment | 30–60% |
| varnish | 25–60% |
| scratch resistance agent (in compound form) | 10–15% |
| solvent | 5–8% |

The scratch resistance agent can be a polyethylene resin dispersion described in Example 1. An example of a suitable varnish is also given in Example 1. The solvent is an oil such as Magie No. 470 oil which is added to attain desired tack and viscosity.

In order that those skilled in the art may better understand how the present invention can be carried into effect, the following examples are given by way of illustration and not by way of limitation. All parts are by weight unless otherwise stated.

EXAMPL 1

Formulation presented in this example, which was prepared by mixing the components set forth below, represents incorporation of 5,5'-methylenedisalicylic acid (MDA) directly into the ink on a dry basis of about 10% by weight of the pigment.

| | |
|---|---|
| Phloxine flush | 40.0 |
| polyethylene resin dispersion | 15.0 |
| MDA | 1.2 |
| varnish | 43.8 |
| solvent | 5.0 |

Composition of the phloxine flush used in the above formulation was as follows:

| | |
|---|---|
| Phloxine red pigment | 40.0 |
| rosin modified resin | 40.0 |
| oleic acid | 3.2 |
| anti-skin compound XL-3086 | 0.6 |
| butyl carbitol acetate | 2.1 |
| Magie No. 470 oil | 14.5 |

The rosin modified resin in 60% by weight Pentalyn K resin in 40% by weight Magie No. 470 oil. The resin is a polymerized rosin esterified with pentaerythrytol. This resin is made by Hercules. The XL-3086 compound is made by Borden.

Magie No. 470 and No. 535 oils, made by Magie Bros. Oil Company, have the following pertinent specifications:

| | No. 470 Oil | No. 535 Oil |
|---|---|---|
| API gravity | 43.7 | 36.9 |
| specific gravity | 0.8076 | 0.8403 |
| flash point, °F. | 230 | 285 |
| a iline point, °F. | 170 | 173 |
| % aromatics | 10 | 22 |
| % olefins | 5 | 2 |
| % paraffins | 85 | 76 |
| molecular weight | 205 | 235 |

The polyethylene dispersion, i.e., DuPont's Elvax 1310, used in the above formulation, has the following composition:

| | |
|---|---|
| solvent, Magie No. 470 oil | 26.1 |
| solvent, Magie No. 535 oil | 26.1 |
| hydrocarbon resin (Hercules AB-180) | 27.8 |
| polyethylene resin (DuPont's Elvax 1310) | 8.0 |
| polyethylene resin AC-6 | 12.0 |

Polyethylene resin, Elvax 1310, is a high molecular weight, low density resin and is suitable for use in printing inks. Some of its more important specifications are:

| | |
|---|---|
| density, g/cc at 23° C. | 0.922 |
| melt index, g/10 min | 2.1 |
| form | 1/8 in. cubes |
| tensile strength, lb/ft³ | 1750 |
| softening point, °F. | 201 |

Polyethylene AC-6 is a low molecular weight resin with density of 0.92 g/cc.

The polyethylene dispersion is prepared by mixing the two solvents and heating the solution 350° F. The hydrocarbon resin is added slowly and the solution is maintained at the same temperature until complete solubility is achieved. The solution is cooled to 300° F and polyethylene resin Elvax 1310 and polyethylene AC-6 are added. Solution is maintained at 300° F until the added ingredients solubilize and then pumped through a votator.

The varnish used in the ink formulation given above contains the following ingredients:

| | |
|---|---|
| isophthalic alkyd resin | 15.0 |
| polyamide resin | 2.0 |
| tridecanol | 3.0 |
| chelated aluminum isopropylate | 1.0 |
| rosin modified resin | 30.0 |
| rosin modified resin | 49.0 |

The alkyd resin has a linseed oil content of 65% and a viscosity of 40–47 poises at 130° F. The polyamide resin was General Mill's Versamid No. 335. The aluminum chelate is made by Chattem Chemical Co.

The varnish is prepared by adding and mixing the alkyd resin, the polyamide resin, tridecanol, the chelate and the Pentalyn K resin dispersion. The mixture is heated from 200° F to 240° F and maintained at that temperature until ingredients completely solubilized. The resulting solution was adjusted to the master standard tack with more of the Pentalyn K resin solution. The solvent used in the above ink formulation was Magie No. 470 oil.

EXAMPLE 2

This formula represents incorporation of MDA in a compounded form which is mixed into the ink without further milling. Again, MDA used was about 10% by weight of the pigment content.

| | |
|---|---|
| Phloxine flush (same as Ex. 1) | 40.0 |
| polyethylene resin dispersion (Same as Ex. 1) | 15.0 |
| compounded MDA | 3.0 |
| varnish (Same as Ex. 1) | 42.0 |
| solvent (Same as Ex. 1) | 5.0 |

The compounded MDA was composed of 10 parts Magie No. 470 oil, 40 parts MDA and 50 parts of varnish of Example 1.

EXAMPLE 3

This example illustrates addition of MDA into the flush color which eliminates the need to add any other material during ink manufacture. The flush was formulated with 10% MDA by weight of pigment and can be added dry during flushing or in a compounded form.

| | |
|---|---|
| Phloxine flush | 40.0 |
| polyethylene resin dispersion (Same as Ex. 1) | 15.0 |
| varnish (Same as Ex. 1) | 45.0 |
| solvent (Same as Ex. 1) | 5.0 |

The Phloxine flush in this example had the following composition:

| | |
|---|---|
| Phloxine red pigment | 34.0 |
| varnish (Same as Ex. 1) | 54.3 |
| tall oil fatty acid | 2.7 |
| MDA | 3.4 |
| anti-skin compound | 0.5 |
| solvent (Magie No. 535 oil) | 5.1 |

Laboratory tests indicate that scumming and inherent bleed in alcohol bearing fountain solutions commonly used in lithography with phloxine red pigment are reduced drastically or eliminated entirely with the use of 5,5'-methylenedisalicyclic acid in the ink formula. Any of the aforementioned methods of incorporation are suitable.

What I claim is:

1. Printing ink suitable for offset printing comprising a varnish and a pigment derived from fluorescein and 5 to 20% of methylenedisalicyclic acid, based on the weight of said pigment.

2. Printing ink of claim 1 wherein said acid is 5,5'-methylenedisalicylic acid and said pigment is tetra bromo fluorescein pigment.

3. Printing ink of claim 2 wherein amount of said acid is 8 to 12%.

4. Printing ink of claim 1 wherein said pigment is selected from the following pigments: tetra bromo fluorescein, tetra iodo fluorescein, tetra chlor tetra bromo fluorescein and tetra iodo tetra chlor fluorescein 3B.

5. Printing ink of claim 4 wherein said acid is 5,5'-methylenedisalicylic acid, said ink containing from 25 to 60% by weight of said varnish, based on the weight of said ink, selected from oils, resins, solvents, driers, waxes and mixtures thereof.

6. Printing ink of claim 2 in liquid form including from 40 to 60% by weight of said varnish, based on the weight of said ink, selected from oils, resins, solvents, driers, waxes and mixtures thereof.

7. Method of printing by the offset technique comprising treating a substrate to provide printing and non-printing areas, applying an aqueous solution to the non-printing areas, applying an ink composition to the printing areas, said ink composition comprising a pigment derived from Fluorescein and 5 to 20% of methylenedisalicylic acid, based on the weight of said pigment.

8. Method of claim 7 wherein said acid is 5,5'-methylenealicylic acid.

9. Method of claim 8 wherein amount of said acid is from 8 to 12%.

10. Method of claim 9 wherein said substrate is paper, said ink is in liquid form and said step of applying said ink to printing areas is effected from an offset cylinder having a flexible surface.

11. Method of claim 10 wherein said pigment is selected from the following pigments: tetra bromo fluorescein, tetraiodo fluorescein, tetra chloro tetra bromo fluorescein and tetra iodo tetra chloro fluorescein.

12. Method of claim 7 wherein said pigment is tetra bromo fluorescein pigment and said varnish is used in amount of 25 to 60% by weight of said ink composition, said varnish being selected from oils, resins, solvents, driers, waxes and mixtures thereof.

13. Printing ink of claim 2 wherein said varnish is oil-based and is used in amount of 25 to 60% by weight of said ink.

14. Method of claim 7 wherein said pigment is phloxine pigment and said varnish is oil-based which is used in amount of 25 to 60% by weight of said ink composition.

* * * * *

UNITED STATES PATENT OFFICE
CERTIFICATE OF CORRECTION

Patent No. 4,001,027          Dated January 4, 1977

Inventor(s) Richard George Lankes, Jr.

It is certified that error appears in the above-identified patent and that said Letters Patent are hereby corrected as shown below:

Col. 1, line 38, after "react" insert --with--;

Col. 3, line 31, change "tetraido" to --tetraiodo--;
       line 39, change "fuorescein" to --fluorescein--;

Col. 5, line 26, after "filter" insert --press--;

line 63, after "solution" insert --to--;

Claim 7, line 5, after "comprising" insert --a varnish and--.

Signed and Sealed this

Twenty-fourth Day of May 1977

[SEAL]

*Attest:*

RUTH C. MASON
*Attesting Officer*

C. MARSHALL DANN
*Commissioner of Patents and Trademarks*